US008832795B2

(12) United States Patent
Dowds et al.

(10) Patent No.: US 8,832,795 B2
(45) Date of Patent: Sep. 9, 2014

(54) USING A COMMUNICATIONS NETWORK TO VERIFY A USER SEARCHING DATA

(75) Inventors: Mark Dowds, Swindon (GB); Paul Richard Davey, Newbury (GB); Ian Ronald Maxwell, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 1059 days.

(21) Appl. No.: 11/914,675

(22) PCT Filed: May 9, 2006

(86) PCT No.: PCT/GB2006/001685
§ 371 (c)(1),
(2), (4) Date: Dec. 8, 2008

(87) PCT Pub. No.: WO2006/123101
PCT Pub. Date: Nov. 23, 2006

(65) Prior Publication Data
US 2011/0131419 A1 Jun. 2, 2011

(30) Foreign Application Priority Data

May 18, 2005 (GB) .................................. 0510158.9

(51) Int. Cl.
| G06F 7/04 | (2006.01) |
| G06F 15/16 | (2006.01) |
| G06F 17/30 | (2006.01) |
| G06F 11/30 | (2006.01) |
| G06F 12/14 | (2006.01) |
| H04L 29/06 | (2006.01) |
| H04N 7/16 | (2011.01) |

(52) U.S. Cl.
CPC ................................ *G06F 17/30867* (2013.01)
USPC ....................... 726/4; 726/9; 726/27; 713/193

(58) Field of Classification Search
USPC ........................... 726/2–7, 9, 26–30; 713/193
See application file for complete search history.

(56) References Cited

U.S. PATENT DOCUMENTS

| 6,360,215 | B1 | 3/2002 | Judd et al. | |
| 6,381,602 | B1 * | 4/2002 | Shoroff et al. | ................ 707/741 |
| 2001/0027451 | A1 * | 10/2001 | Taguchi et al. | .................... 707/3 |
| 2002/0194499 | A1 * | 12/2002 | Audebert et al. | ............. 713/201 |
| 2003/0093409 | A1 | 5/2003 | Weil et al. | |

(Continued)

FOREIGN PATENT DOCUMENTS

| EP | 1 489 810 | 12/2004 |
| GB | 2 339 041 A | 1/2000 |

(Continued)

OTHER PUBLICATIONS

Search Report issued for UK Patent Application No. GB0510158.9, date of search Aug. 31, 2005.

*Primary Examiner* — Philip Chea
*Assistant Examiner* — Trong Nguyen
(74) *Attorney, Agent, or Firm* — Kratz, Quintos & Hanson, LLP

(57) ABSTRACT

Systems and methods of searching a plurality of data items which include selected data items with respective access tags defining access criteria for those data items. A search request token including search criteria and data identifying a user from an entity associated with the user is received. The user by verified by seeking confirmation that the user is a subscriber with a communications network. Data items from the plurality of data items which are potentially relevant to the search criteria are identified. For any identified data items having access tags, determining whether the verified user has permission to access the identified data items with reference to the data of the search request token. Search results including an indication of identified data items but excluding any such data items for which it is determined that the user does not have permission to access are generated.

31 Claims, 7 Drawing Sheets

(56) References Cited

U.S. PATENT DOCUMENTS

| | | |
|---|---|---|
| 2004/0070678 A1 | 4/2004 | Toyama et al. |
| 2004/0078224 A1 | 4/2004 | Schramm-Apple et al. |
| 2004/0181679 A1* | 9/2004 | Dettinger et al. ............. 713/193 |
| 2005/0005168 A1* | 1/2005 | Dick ............................. 713/201 |

FOREIGN PATENT DOCUMENTS

| | | |
|---|---|---|
| GB | 2 378 094 | 1/2003 |
| GB | 2 378 096 | 1/2003 |
| GB | 2 378 097 | 1/2003 |
| WO | 98/19417 A2 | 5/1998 |
| WO | 02/099655 A1 | 12/2002 |
| WO | 03/013172 | 2/2003 |
| WO | 03/013173 | 2/2003 |
| WO | 03/013174 | 2/2003 |
| WO | 2004/036513 | 4/2004 |
| WO | WO 2004036513 A1 * | 4/2004 |

* cited by examiner

USING A COMMUNICATIONS NETWORK TO VERIFY A USER SEARCHING DATA

TECHNICAL FIELD

The present invention relates to a method of, apparatus for and computer program for searching data, and in one aspect, particularly, but not exclusively, to a searching arrangement in which data which is accessible only to a restricted number of users is presented in the search results to only those users.

BACKGROUND ART

Search engines such as Google provide an excellent way of collating vast amounts of data that exist on networks (such as the World Wide Web), and provides search results ranked in order of potential relevance in dependence upon search criteria set by the user. A drawback of this type of searching, however, is that information that is secure or has restricted access is either not identified in the search results, or is inadvertently made publically available when access restrictions are accidentally bypassed.

A search engine is a computer program that assists in finding data stored on a computer or network of computers, for example a public server on the World Wide Web, or on one's own computer. For example, a search engine may allow one to search for content meeting specific criteria, such as content containing a given word or phrase, and retrieving a list of files that match those criteria. Search engines typically use a previously generated, and regularly updated, index to search for data, in accordance with the search criteria entered.

BRIEF SUMMARY OF THE INVENTION

In accordance with one aspect of the invention, there is provided a method of searching a plurality of data items, the method including providing selected data items with respective access tags defining access criteria for those data items; authenticating an entity that wishes to perform a search; receiving search criteria from the entity; identifying data items potentially relevant to the search criteria; for any identified data items having access tags, determining whether the authenticated entity has permission to access the data with reference to the access criteria of that token; and generating search results including an indication of identified data items but excluding any such data items for which it is determined that the entity does not have permission to access.

In accordance with another aspect of the invention, there is provided a computer program for searching a plurality of data items, selected data items having respective access tags defining access criteria for those data items, the computer program including instructions for determining whether an entity that wishes to perform a search is authenticated; receiving search criteria from the entity; identifying data items potentially relevant to the search criteria; for any identified data items having access tags, determining whether the authenticated entity has permission to access the data with reference to the access criteria of that token; and generating search results including an indication of identified data items but excluding any such data items for which it is determined that the entity does not have permission to access.

In accordance with a further aspect of the invention, there is provided apparatus for searching a plurality of data items, the apparatus including means for providing selected data items with respective access tags defining access criteria for those data items; means for authenticating an entity that wishes to perform a search; means for receiving search criteria from the entity; means for identifying data items potentially relevant to the search criteria; means for determining, for any identified data items having access tags, whether the authenticated entity has permission to access the data with reference to the access criteria of that token; and means for generating search results including an indication of identified data items but excluding any such data items for which it is determined that the entity does not have permission to access.

In an embodiment to be described, data for which there is to be restricted access can be identified with a tag. The tag may, for example, indicate which users or entities are able to access that data. For example, the tag may indicate that only user X, Y and Z is able to access the data. Alternatively, the tag could indicate that only members of a particular organisation which have a specific security clearance level or above are able to access the data. If the search engine in accordance with the embodiment knows the identity of the user performing a search, the search engine is configured to display search results including the restricted data only if the search is performed by a user entitled to access that data. Therefore, the user not entitled to view the data is not distracted by search results corresponding to data that that user is unable to access. Advantageously, the user is authenticated with a network, and the result of this authentication is communicated to the search engine so that the search engine can be satisfied that the user is who they say they are. For example, the authentication could be by means of a subscriber identity module (SIM) of the type used in GSM or UMTS mobile telecommunications networks. The authentication mechanism may correspond to that performed by a subscriber of a mobile telecommunications network when they access their mobile terminal in the radio coverage area of that network. However, it should be appreciated that, in the embodiment, the data for performing the authentication does not necessarily have to be transmitted over a wireless network, but could be transmitted at least partly over a fixed network, possibly including the Internet.

The restricted data may be encrypted, so that the data is only usable by entities possessing an appropriate decryption key. The tag may include an indication of the encrypted content (for example, meta data), to enable the search engine to determine the nature of the content.

For example, a user may wish to make photographs available to friends and members of his family. The data or file representing the photographs will include a tag, which indicates the users that are allowed access to the photographs. Conveniently, the originator of the photographs may designate the users able to view the photographs by selecting a predetermined group of users, for example from a "buddy list" or the like. The users able to view the photographs may be selected using the graphical user interface of the user's PC. The photographs with the tags appended thereto can then be uploaded to an appropriate web site (or other storage location accessible by third parties). When the search engine performs a search for a user who is permitted to view the photographs, that user will authenticate themselves with the search engine. When the search engine identifies the photographs, the tags of those photographs will be read and it will be determined that the user performing the search is permitted to see the photographs. Therefore, the photographs will be identified in the search results produced by the search engine. For example, the search results may include a link to the address where the photographs are stored, allowing them to be downloaded by the user by clicking on that link. The photographs may optionally be encrypted. In such circumstances, the photographs may be decrypted before being downloaded to the user's PC, or they may be downloaded to the user's PC in encrypted form, with the decryption being performed at the user's PC.

BRIEF DESCRIPTION OF THE DRAWINGS

A method, apparatus and computer program for controlling access to data, embodying the invention, will now be described, by way of example only, with reference to the accompanying diagrammatic drawings in which.

In the figures like elements are generally designated with the same reference numbers.

DETAILED DESCRIPTION OF EMBODIMENTS OF THE INVENTION

Although the foregoing and following discussion has referred to a "user" or "subscriber", it should be understood that a searching process for data may not necessarily involve a human user: the searching process may be performed to operate automatically (for example, intermittently operating with an information-gathering or monitoring role).

In the embodiments of the invention a device is provided which includes authentication storage means for storing predetermined authentication information for authenticating the user of the device. In the embodiment, the device is portable and can thus be taken by the user and coupled to or associated with any data processing apparatus (or computer) which is adapted to communicate with it, so as to enable that user to be authenticated and the data stored on the flash memory accessed with that data processing apparatus.

Such a device may be a "dongle" type device which is connectable to a PC and is hereinafter referred to as a dongle, for the sake of brevity.

Advantageously, the authentication storage means comprises a smart card. In a more specific example, the smart card is a credit card-like device which incorporates a clip which stores authentication information, or a Subscriber Identity Module or SIM of the type used in and for authenticating the use of handsets in a mobile or cellular telecommunications network—such as a GSM (Group Special Mobile) or UMTS/3G (Third Generation) network. Although the term "SIM" is used herein, it should be appreciated that the SIM may be a 3G USIM, an ISIM (IP-based Multimedia Subsystem—IMS—SIM) or a UICC (Universal IC Card)—a smart card platform defined by ETSI SCP on which SIM, USIM or ISIM can reside.

Figure 1:
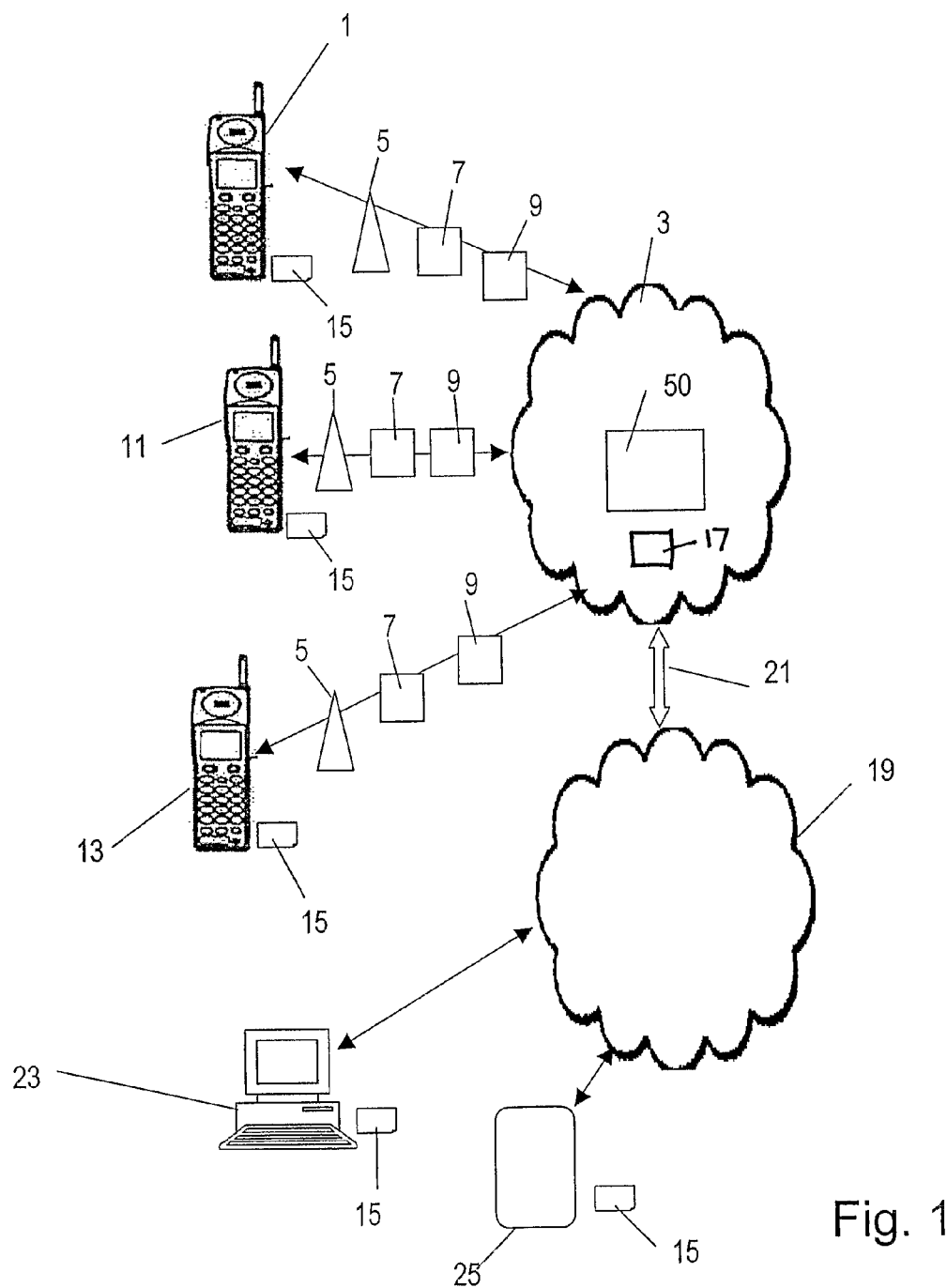
FIG. 1 shows the basic elements of a telecommunications network.

FIG. 1 shows a UMTS mobile or cellular network in which the SIM may be usable. Mobile terminal 1 is registered with UMTS (3G) mobile telecommunications network 3. The mobile terminal 1 may be a handheld mobile telephone, a personal digital assistant (PDA) or a laptop computer equipped with a datacard. The mobile terminal 1 communicates wirelessly with mobile telecommunications network 3 via the radio access network (RAN) of the mobile telecommunications network 3, comprising, in the case of a UMTS network, base station (Node B) 5, and radio network controller (RNC) 7. Communications between the mobile terminal 1 and the mobile telecommunications network 3 are routed from the radio access network via serving GPRS support nodes (SGSN) 9, which may be connected by a fixed (cable) link to the mobile telecommunications network 3.

In the conventional manner, a multiplicity of other mobile terminals are registered with the mobile telecommunications network 3. These mobile terminals include mobile terminals 11 and 13. The terminals 11 and 13 communicate with the mobile telecommunications network 3 in a similar manner to the terminal 1, that is via an appropriate Node B 5, RNC 7 and SGSN 9.

The mobile telecommunications network 3 includes a gateway GPRS support node (GGSN) 17 which enables IP-based communications with other networks, such as the Internet 19 via an appropriate link 21. A multiplicity of terminals are connected to the Internet (by fixed or wireless links), and a PC terminal 23 and a PDA terminal 25 are shown by way of example.

Each of the mobile terminals 1,11 and 13 is provided with a respective SIM 15. The SIM 15 is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN. During the manufacturing process of each SIM, authentication information is stored thereon under the control of the mobile telecommunications network 3. The mobile telecommunications network 3 itself stores details of each of the SIMs issued under its control (including the authentication information) in the SIM management function 50. According to the embodiment described, this authentication information includes a plurality of key sets, which can be used to encrypt/decrypt communications with the SIM.

In normal operation of the mobile telecommunications network 3, a terminal 1, 11, 13 is authenticated (for example, when the user activates the terminal in the network with a view to making or receiving calls) by the network sending a challenge to the terminal 1,11,13 incorporating a SIM 15, in response to which the SIM 15 calculates a reply (dependent on the predetermined information held on the SIM—typically an authentication algorithm and a unique key Ki) and transmits it back to the mobile telecommunications network 3. The SIM management function 50 of the mobile telecommunications network 3 generates the challenge and receives the reply from the terminal 1,11,13. Using information pre-stored concerning the content of the relevant SIM 15, the SIM management function 50 calculates the expected value of the reply from the mobile terminal 1,11,13. If the reply received matches the expected calculated reply, the SIM 15 and the associated mobile terminal (and the user thereof) are considered to be authenticated.

It should be understood that such an authentication process can be performed for any terminal provided with a SIM 15 under control of the mobile telecommunications network 3. When the terminal is a mobile telephone handset, the terminal communicates wirelessly with the mobile telecommunications network 3 via the network's radio access network, although this is not essential. For example, the terminal may communicate with the network via the fixed telephone network (PSTN), via a UMA "access point" and/or via the Internet. The PC 23 and the PDA 25 may also be provided with a SIM 15 under the control of the network, and these SIMs permit authentication also—although not necessarily by transmission of authentication data via the RAN of network 3.

The SIM 15 used by the terminal 1,11,13,23,25 may be a SIM of the type defined in the GSM or UMTS standards specifications, or may be a simulation of a SIM—that is, software or hardware that performs a function corresponding to that of the SIM (which may itself be embedded in another device). The SIM may be in accordance with the arrangement described in WO-A-2004 036513.

It may be desirable to be able to change the authentication information on the SIM (or simulated SIM) to take account of changed circumstances. For example, the SIM may be a SIM registered with a particular cellular telecommunications network—a network applicable to the country or region where the data processing apparatus or computer is to be used. However, circumstances may arise (for example, the apparatus or the computer is physically moved to a different country or region) in which it is desirable or necessary to re-register the SIM with a different cellular telecommunications network. Ways in which this can be done are disclosed in GB-A-2378094, GB-A-2378096 and GB-A-2378097 and in WO-A-03/013174, WO-A-03/013173 and WO-A-03/013172. As described therein in more detail, a SIM (and thus also a simulated SIM) may be initially provided with authentication (and other) information relating to each of a plurality of networks, the information respective to the different networks being selectively activatable.

It is not necessary, however, for the users to be subscribers to a telecommunications network. Instead, they could be subscribers registered with some other centralised system which could then carry out the authentication process in the same way as in a telecommunications network. In such a case, the registration of a SIM (or simulated SIM) could be transferred from one such centralised system to another in the same manner as described above.

As described above, an aim of the authentication process in the embodiment to be described is to facilitate improved searching of data which is secure or has restricted access. Where the authentication process is carried out by a telecommunications network, or by some other system, to which the user of the SIM is a subscriber, the satisfactory completion of the authentication process may then be communicated to the search engine—to enable secure or restricted data to be identified in the search results, if appropriate.

Figure 2:
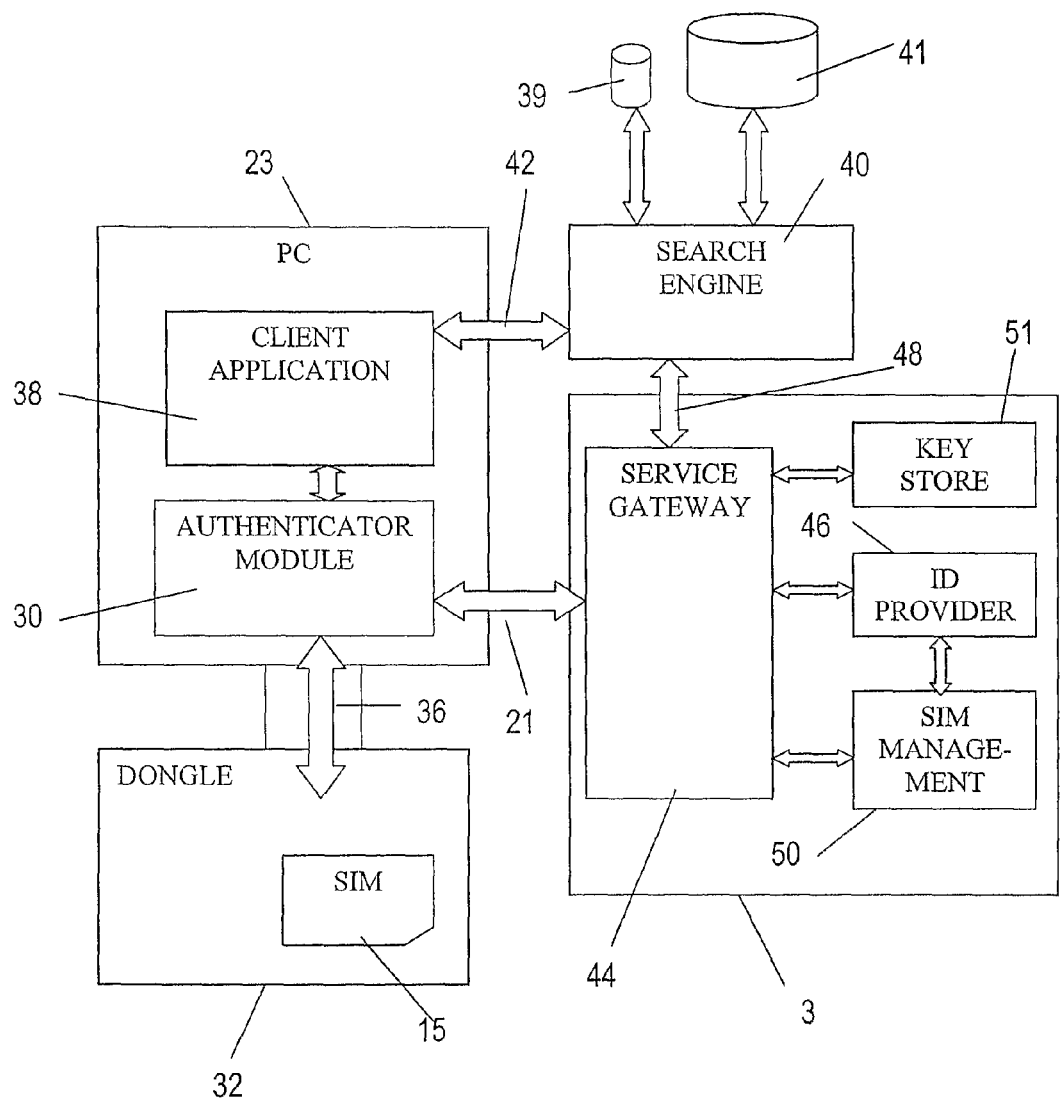
FIG. 2 is a block diagram for explaining the elements for returning search results in accordance with the embodiment.

The block diagram of FIG. 2 schematically illustrates the elements involved in returning search results in accordance with the embodiment.

A client platform, such as a Windows (RTM) based PC 23, includes an authenticator module 30 which forms part of a client sub-system. A dongle 32 having a SIM 15 therein is provided, and communication between the dongle 32 and the authenticator module 30 is performed via connection 36 (which may be a wired or wireless connection).

A client application 38 (a Web browser in the embodiment) is provided on the PC 10, which allows the user to obtain services from a remote search engine 40. It should be understood that by "remote" it is not intended to imply that there must be a particular geographical distance between the PC 23 and the search engine 40. However, generally the search engine 40 will be controlled independently of the PC 23—although this is not essential. For example, the search engine 40 may be part of the network of the employer of the user of the dongle 32, or the search engine 40 may itself be an application running on the PC 23 (it may be the client application 38).

The search engine 40 includes an algorithm for allowing the user of PC 23 to search for particular data using one or more key words, for example. The search engine may search data on the World Wide Web and elsewhere. The search engine may compile an index of search data using "crawler" or "spider" programs in the conventional way, or may operate on any other known principle.

In the embodiments described, data available to the search engine includes general publically available data represented by database 39 and a database 41 of photographs made available on the Internet by data provider "A". Data provider A is a relative of the user of PC 23 and dongle 32. The photographs stored on database 41 under the control of data provider A are photographs of data provider A's children. Data provider A wishes photographs of his children to be available to relatives only. In accordance with a feature of the embodiments, the data representing each of the photographs on database 41 is accompanied by a tag or other identifier. This tag indicates who has permission to view each photograph. These individuals or entities may be identified by any suitable means—for example, their telephone number (MSISDN), their SIM identifier, their IMSI or any other suitable identifier. Conveniently, the data provider A may be able to select predefined groups of users that are able to access particular photographs. For example, the data provider A may be able to use the graphical user interface of the PC 23 to indicate that a photograph may be viewed by all the people contained in a predefined "buddy list", that might have been compiled for a different purpose for example, for use in Internet-based communications such as MSN buddy lists. Alternatively/additionally, the data provider A may use a predefined contact group stored in the SIM 15 on the dongle 32. These groups may have been predefined previously for another purpose—for example, to conveniently separate the contacts in the data provider A's phone book stored on the SIM 15. The categories might, for example, include family members, co-workers, friends, etc. The use of these predefined groups or buddy lists provides a convenient mechanism of allowing a plurality of users or entities to be given permission to view a particular photograph without having to separately input details of those users or entities when each tag is generated for a photograph.

The search engine 40 differs from a conventional search engine in that it can recognise and interpret the tags. This aspect of the search engine 40 will be described in more detail below.

In this embodiment a mobile telecommunication network 3 provides via a service gateway 44 an identity provider service 46, and SIM management service 50. It should be understood that the network 3 may be any type of network—the invention is not restricted to mobile telecommunication networks. For example, the service gateway 44 may be provided in a computer that is linked to PC 23 by a local area network, a wide area network and/or the Internet.

The dongle 32 may allow wired or wireless communication with the PC 23. Preferably, the communication between the dongle 32 and the PC 23 is secure. The communications may be encrypted, or any other means for secure communication may be employed.

The dongle 32 may receive the SIM 15, or may incorporate software or hardware simulating a SIM 15. The SIM or simulation of the SIM 15 is operable to perform the same authentication functions of the SIM 15 described in relation to FIG. 1. The dongle 32 allows data for authenticating a user or a particular transaction of the user to be passed between the dongle 32 and the PC 23 and onwardly to/from the network 3. Appropriate connectors are provided within the dongle 32 for allowing electronic exchange of data between the SIM 15 and the dongle 32. The dongle 32 connector 36 allows connection for data communication purposes to the PC 23. For example, the connector 36 could be a USB connector, a Firewire 1394 connector, a SmartMedia (RTM) connector, a near field connector (e.g. using NFCIP-1 protocol), bluetooth connector, infra-red connector or any other suitable connector.

Figure 3:
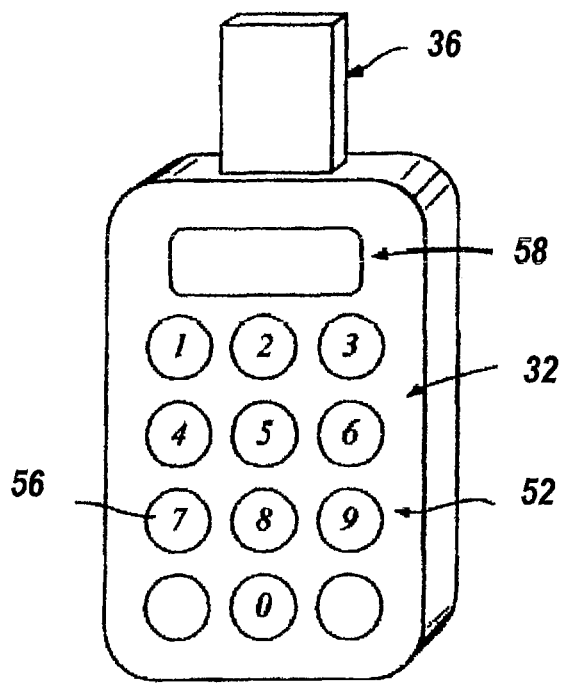
FIG. 3 is a perspective view of one configuration of a dongle.

The housing 52 of the dongle 32 shown in FIG. 3 may optionally have a variety of push buttons 56 mounted thereon, ten of which have respective numerals from 0 to 9 displayed thereon. In this embodiment, the dongle 32 includes means (such as software) for receiving the entry of a PIN number from a user by operating the appropriately designated push buttons 56. The housing 52 may further optionally provide a display 58 for prompting the user to enter their PIN number and/or for displaying the PIN number as it is entered, if desired, as well as other information.

It should be appreciated that as an alternative to push buttons 56, other means could be provided for allowing PIN entry. Alternatively, the user could be authorised to use the SIM 15 by obtaining some other security information from the user and comparing this with data stored on the SIM 15. For example, the data obtained could be the user's fingerprint or some other characteristic which is unlikely to re-occur on another person—for example, any suitable biometric data. The details of a previously stored fingerprint (or other information) may be stored on the SIM 15 or the network 3 (or elsewhere) for comparison with the input data representing the characteristics.

In the above description it has been indicated that the SIM used to authenticate the user could have the form of a conventional SIM which is provided in the dongle 32. This could simply be the SIM that a subscriber to a mobile network uses in their conventional mobile telephone handset to make and receive calls. Alternatively, the SIM 15 could be removably fitted directly to the PC 23 or embedded within the PC 23 (such that it cannot be readily removed or cannot be removed at all). Further alternatively, as mentioned above, the SIM may not have a separate physical form, but may be simulated by means of software and/or hardware within the PC 23 or the dongle 32. The SIM could be simulated or incorporated into the chip set of the PC 23. For example, the SIM could be incorporated or simulated within the central processor unit of the PC 23. Such an arrangement prevents the SIM (or simulated SIM) being removed from the PC 23 (other than by rendering the PC 23 useless).

If the SIM is of a form that is not readily removable from the PC 23 or dongle 32, a subscriber to the telecommunications system may be provided with a second SIM for use, for example, in their mobile telephone handset.

If, however, the same SIM is used (in the PC 23 or the dongle 32) to authenticate transactions and for use in the conventional manner with the telecommunications network 3 (for example, to make and receive calls using a mobile telephone handset), the same data may be used to provide authentication of transactions as is used to authenticate the SIM with the mobile telephone network 3 when a call is being made. Alternatively, the SIM may have separate records for performing each authentication type. There may be a first record containing data and/or algorithms for use in authenticating transactions, and a second, separate record for use in the conventional manner for authenticating the terminal with the telecommunications network 3. The first and second records may have respective authentication keys, unique identifiers to the telecommunications network 3 and/or unique authentication algorithms. The mobile telephone handset need not be authenticated with the network 3 for the SIM to authenticate a transaction for the PC 23.

The dongle 32 may also perform the functions of a conventional data card for use with a PC (or other computing device). The dongle will therefore include means for wireless telecommunication with the network 3. With this arrangement, the dongle will be of a suitable size and will include suitable connectors for allowing it to operate as a data card, in addition to the dongle having the functions described above.

Reference will now be made to the flow chart of FIG. 4.

When the subscriber wishes to perform a search (step A of the flow chart shown in FIG. 4A), the subscriber couples their SIM 15 to the PC 23 by inserting their dongle 32 containing the SIM 15 into the appropriate connecting slot of the PC 23 or using a wireless link, or starts-up the PC23 with the dongle 32 coupled thereto (step B).

Figure 5:
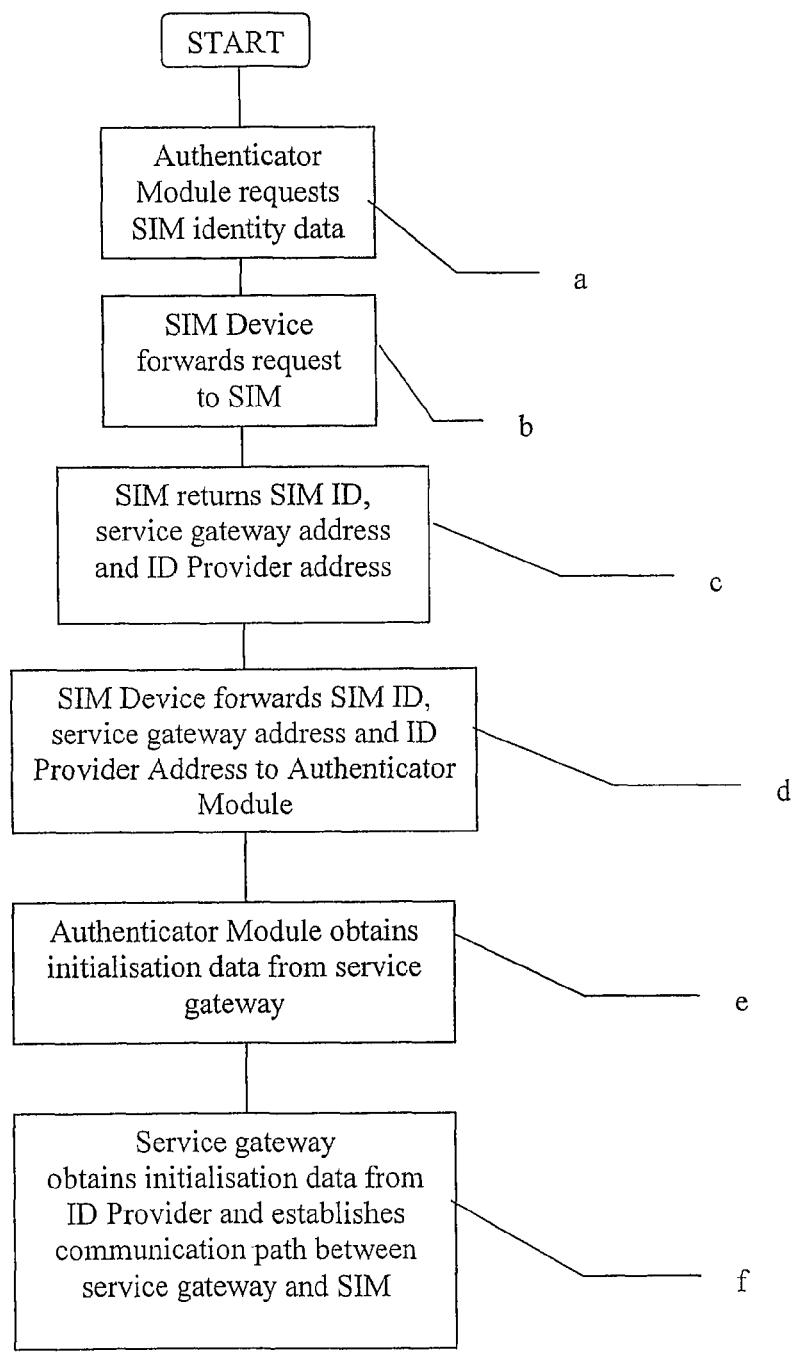
FIG. 5 is a flow chart for use in the understanding the establishment of a communication channel between a SIM and a network operator and authentication of the SIM.

The coupling of the dongle 32 to the PC23 triggers the following initialisation process, as illustrated by the flow chart of FIG. 5

The authenticator module 30 requests from the SIM 15 data identifying that SIM, and an indication of the identity provider 46 and service gateway 44 to which it belongs (that is the identity provider 46 and service gateway associated 44 with the SIM management function 50 under the control of which the SIM 15 was issued, for example)—step a. These requests by the authenticator module 30 for data from the SIM 15 are passed from the authenticator module 30 to the dongle 32. The dongle 32 forwards the request to the SIM 15—step b. The SIM 15 returns its identity data, the service gateway 44 address and the address of its identity provider 46—step c. The SIM device 32 forwards this data to the authenticator module 30—step d.

The authenticator module 30 then contacts the service gateway 44 via link 21 to request initialisation data therefrom—step e. The authenticator module 30 may be provided with a "global" key—for example, a key that is provided to all authenticator modules 30 issued under control of the network 3. Such a key may be obfuscated in implementation. Also, the key may be updated if it is compromised. The authenticator module 30 provides the global key to the service gateway 44 to verify the integrity of the authenticator module 30. The initialisation data request is passed by the service gateway 44 to the identity provider 46. The identity provider checks the SIM identity data, service gateway 44 address and identity provider 46 address, and if this information is determined to be correct, the identity provider 46 generates initialisation data for the service gateway 44 which enable the service gateway 44 to establish a communication path or tunnel to the SIM 15 (via the authenticator module 30 and dongle 32)—step f. As indicated above, authentication information for each SIM is stored by the SIM management function 50. The ID provider 46 selects a suitable key set (using key set data obtained from the SIM management function 50) for encrypting the content of the data packets transmitted over the communication path. The header of each data packet includes an indication of the key set selected—but not the keys themselves. This header data is received by the SIM 15 via link 21 and the key set indicator is identified. The corresponding key set provided in the SIM 15 during manufacture is accessed and used to decrypt messages received from the service gateway 44 during the communication session now established. Optionally, new key sets may be transmitted to the SIM 15 and corresponding key sets stored in the SIM management function 50, in order to allow new key sets to be used to encrypt messages.

If, for example, the dongle 32 is recorded by the network 3 as lost or stolen, the network will not allow the establishment of a communication session, thereby preventing authentication of the SIM 15 and access to the data on the flash memory 16.

The data packets are not necessarily transmitted over the air (wirelessly). They may be transmitted over the air or they may be transmitted over a fixed (wired network) including the Internet.

The subscriber will then be authenticated by the service gateway 44 performing a challenge and response session with the SIM (by sending data via the authenticator module 30 and link 21). The service gateway 44 will send a random challenge to the authenticator module 30, which is transmitted to the SIM 15. This challenge is sent as an data packet that is encrypted using a selected key set in the manner described above. The SIM 15 decrypts the data packet using the corresponding key set stored on the SIM 15. The decrypted challenge is then extracted. The SIM 15 generates a response by encrypting the random challenge using both an authentication algorithm and a unique key Ki resident within the SIM 15 and assigned to that SIM (and the user thereof). The response is encrypted using the selected key set and encapsulated in a data packet with a header indicating the key set used (and also the nature and destination of the data packet). The data packet is transmitted to the service gateway 44 via the authenticator module 30. The service gateway 44 decrypts the data packet using the key set data obtained from the SIM management function 50 via the ID provider 46. The decrypted SIM response is then passed to the ID provider 46. The ID provider 46 analyses the response to determine whether it is the response that would be expected from that subscriber's SIM 15 (again using data obtained from the SIM management function 50). If the response is as expected, then the SIM 15 is considered to be authenticated by the network.

The authenticator module 30 itself need not understand the data exchanged during the challenge and response procedure—it merely acts as a conduit for this data—indeed, it will not be able to decrypt the data packets because the key sets are not known to it. The primary role of the authenticator module 30 is to facilitate the transfer of data to and from the SIM 15. The authenticator module 30 acts as a conduit for data being passed to and from the SIM 15. The authenticator module 30 may be software provided by or under control of the network 3, so that the software is trusted by the network 3 to communicate with the SIM 15 only in a predetermined manner. For example, the authenticator module 30 does not allow applications of the PC 23 to access security data stored on the SIM 15 other than in a manner that is acceptable to the network 3.

As an additional security measure, the challenge data packet generated by the service gateway 44 may include a command which requires the subscriber to provide some security data, such as a PIN or biometric data. This command is extracted and executed by the SIM 15. The SIM 15 then sends a command to the dongle 32 to prompt the user to enter their PIN using the buttons 56 (or to provide biometric data). The PIN (or biometric data) is encapsulated in the encrypted response data packet, and is compared with a pre-stored PIN or biometric data that the subscriber has previously provided to the ID provider 46.

Figure 4:
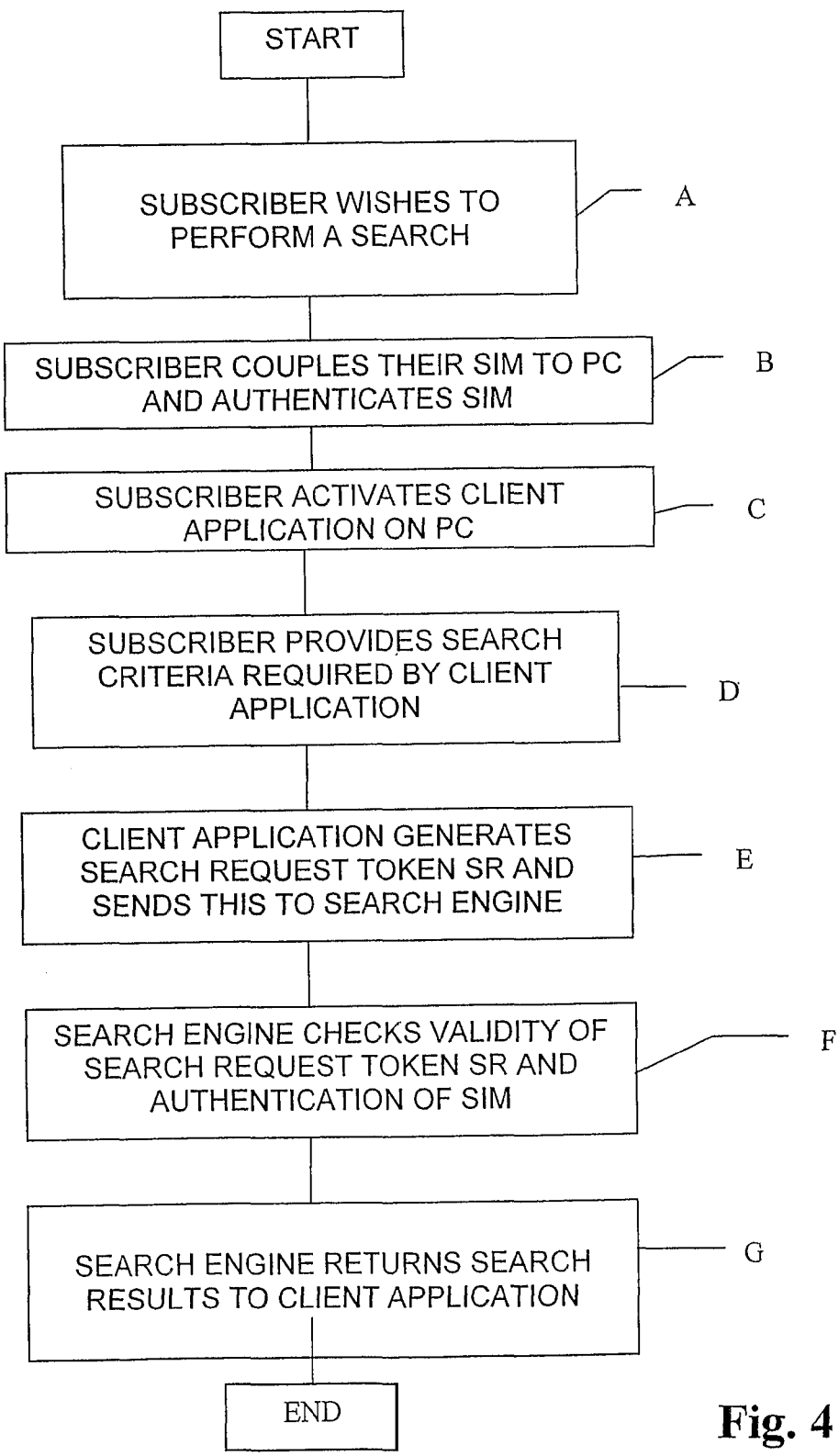
FIG. 4 is a flow chart for use in understanding the search process carried out by the data processing apparatus of FIG. 2.

Returning to the flow chart of FIG. 4, after authentication, the client application 38 on the PC 23 is activated, for example by "clicking" on an icon provided on the graphical user interface of the PC 23)—step C. This client application 38, may be a web browser that enables access to an appropriate website controlled by the search engine 40. Alternatively, the client application 38 may be special software provided under control of the search engine 40 for installation on the subscriber's PC 23 itself. The search engine 40 enables the establishment of a communication channel 42 between the client application 38 and the search engine 40. The data communication between the client application 38 and the search engine 40 may be via the Internet by a fixed network (e.g. PSTN) or by a wireless network—such as the network 3 or another mobile or cellular communications network.

The subscriber then provides the search criteria—for example, using the graphical user interface of the PC 23—step D) The search criteria may comprise key words such as "user A" and "family photographs". The client application generates a search request token SR. The search request token SR includes data identifying the search criteria, data identifying the subscriber (such as the subscriber's SIM identifier) and data identifying the search engine 40. Additional or alternative information may of course be provided in the search request token SR. The search request token SR is sent to the search engine 40 via link 42—step E.

The search engine 40 determines whether the search request token SR satisfies certain criteria—for example, that the subscriber is known to the search engine 40 and has a valid subscription with and is authenticated with the network 3. The validity of the subscription and the authentication status of the subscriber is determined in a data exchange between the search engine 40 and the service gateway 44 of the network 3 via link 48—step F. The service gateway 44 will only indicate that the subscriber is authenticated if the authentication procedure described with reference to FIG. 5 has been completed (possibly no longer than a predetermined period in the past). The link 48 may be made by a fixed or wireless connection, for example via the Internet.

The search engine 40 then extracts the search criteria from the search request token SR and performs a search of data available to it—for example, using pre-compiled indexes in the known manner—and generates ranked search results. The search results may comprise a list of headings, which summarise the content of each potentially relevant data source and include a link to that data source. As indicated above, the search engine 40 includes a mechanism for recognising and interpreting tags associated with data from a data source. The presence and content of a tag associated with the data source may be stored in the index when that index is compiled by the search engine 40. If any of the search results include a tag which indicates that the data source has restricted access, the search engine 40 analyses the content of the tag. If the search results indicate that the photographs of A's children are relevant to the search criteria, the search engine 40 will determine that the tag will allow only specified individuals to access the data (A's relatives). The search engine 40 knows the identity of the user of the dongle 32 by virtue of the content of the search request token SR provided from the client application 38, and can be satisfied that this is accurate because the SIM 15 within the dongle 32 has been authenticated with the network 3 (and verified by the search engine 40 via the link 48 with the service gateway 44 of the network 3). The search results can therefore include references to data sources with tags indicating that the user of the dongle 32 has permission to view the data source associated with those tags. Other data sources with tags to which the user of dongle 32 is not entitled access are not included in the search results.

The search results are then transmitted to the client application 38—step G. For example, the user may use the graphical user interface of the PC 23 to "click" on search results of interest to access the data sources (for example, web pages) associated therewith. If the user clicks on the link to the photographs of A's children, the user will be able to view the web page including those photographs, retrieved from the database 41.

In the manner described above, the search results returned to a user will only include sources of tagged data where that user is entitled to view that tagged data. Therefore, the search results will not facilitate access to tagged data by users other than those entitled to retrieve that tagged data.

Security of tagged data may be improved by storing that data in encrypted form on the database 41.

The search engine 40 may retrieve the encrypted photograph from the database 41 and decrypt that photograph prior to transmitting it to the client application 38. The search engine 40 may obtain a decryption key to facilitate the decryption of the encrypted data from any suitable source. Search engine 40 may store decryption keys stored elsewhere associated with different tags or have a lookup table of the location of decryption keys associated with respective tags. Search engine 40 is operable only to retrieve a decryption key and decrypt data when it is satisfied that the user requesting that data is properly authenticated in the manner described above.

Figure 6A:
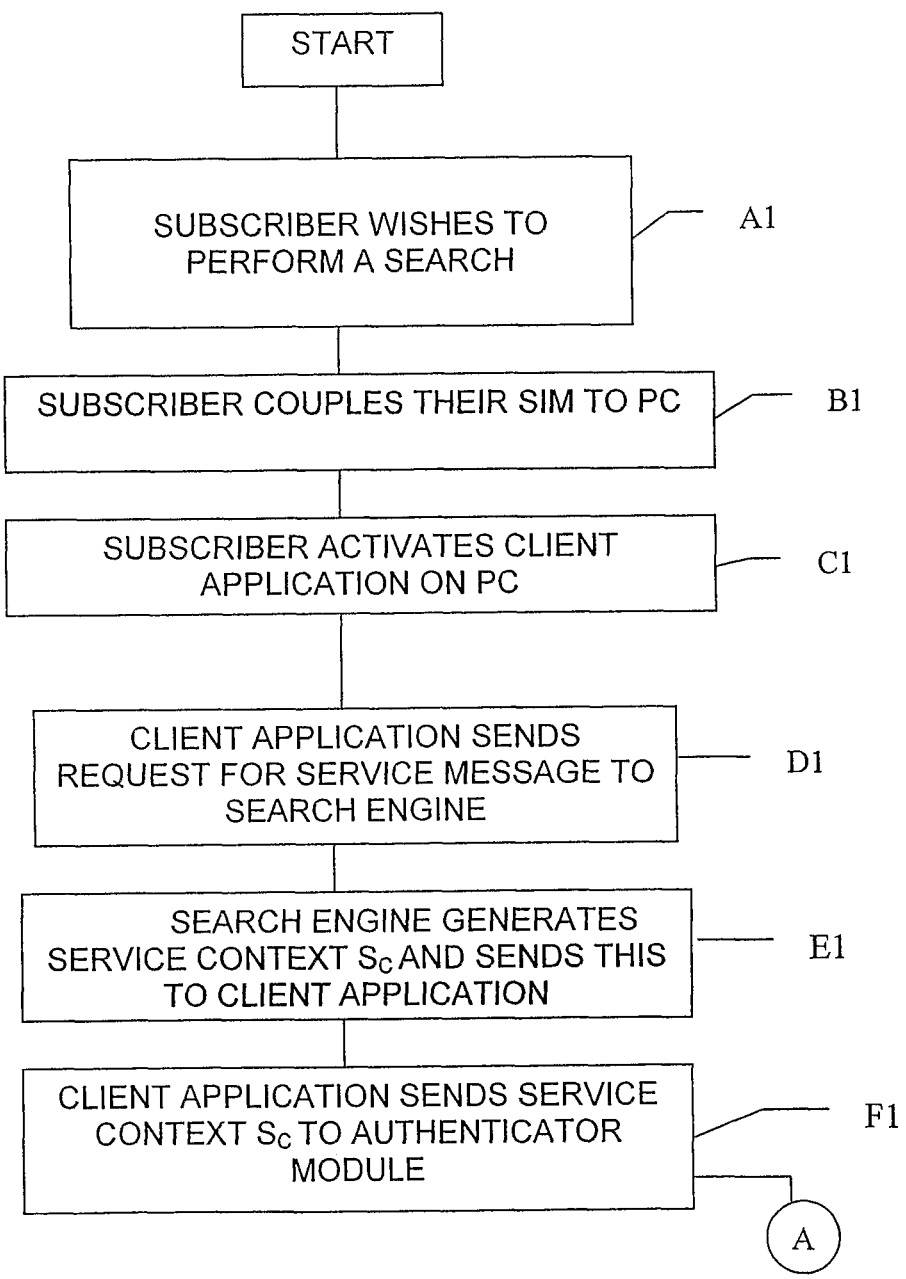
FIGS. 6A and 6B are a flow chart for use in understanding the search process according to a further embodiment of the invention.
Figure 6B:
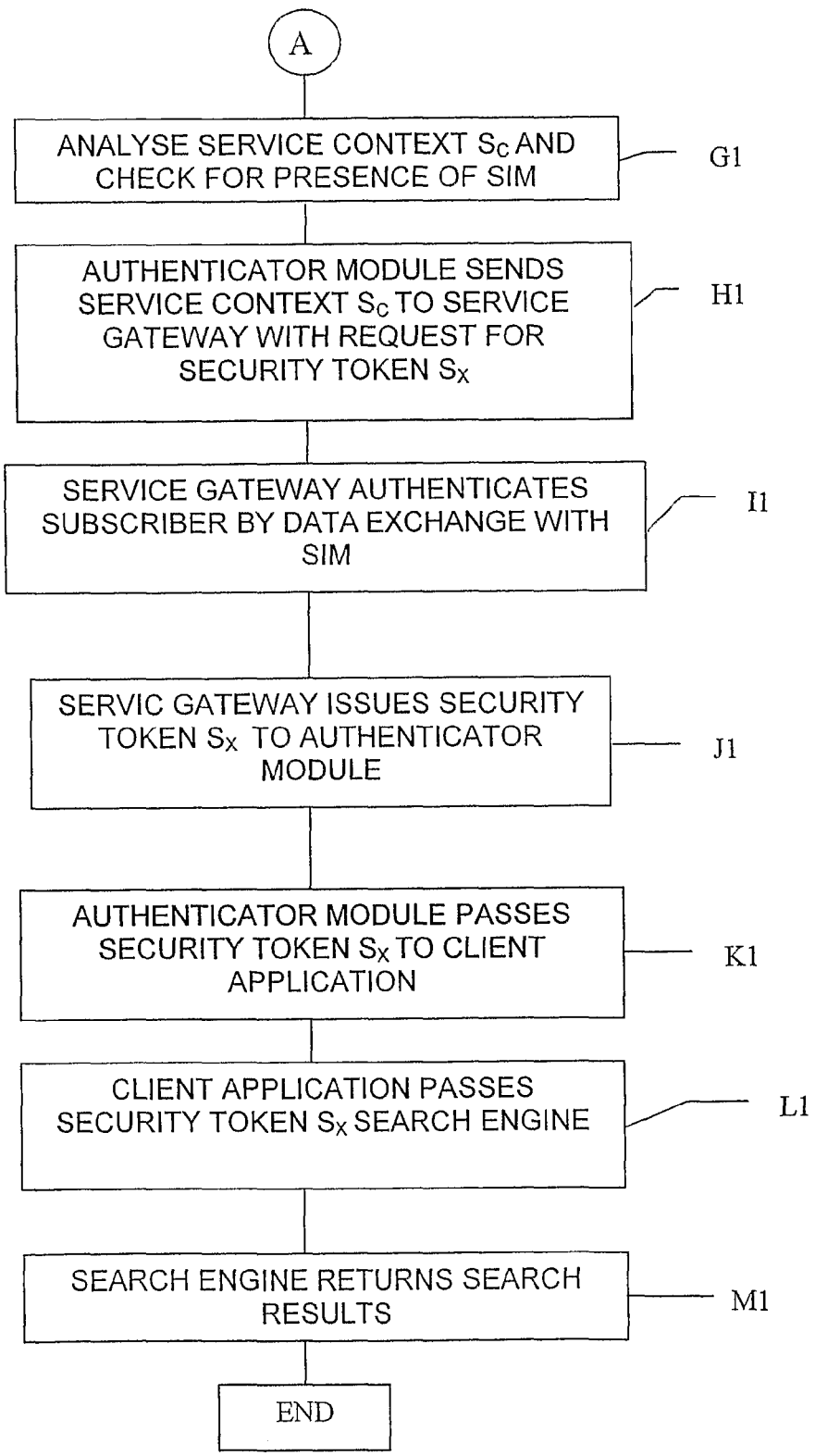

In accordance with a further embodiment of the invention, which may provide enhanced security, the photograph (or other encrypted data) may not be decrypted by the search engine 40, but is passed in encrypted form to the client application 38. This embodiment will now be described in more detail with reference to the flow chart of FIG. 6.

When the user A stores the photographs on the database 41, the photographs are encrypted. The key for decrypting the photographs is stored at a storage location 51 on the network 3, that is associated with that database 41.

When a user wishes to perform a search (step A1 of the flow chart of FIG. 6A), the user couples their SIM 15 to the PC 23 in step B1 in the manner described in relation to FIG. 4. However, unlike the arrangement described in FIG. 4, the user is not necessarily authenticated with the network 3 at this stage.

The subscriber then activates the client application 38—step C1, in the manner described in relation to FIG. 4.

The subscriber enters search criteria in the manner described above. The search criteria and information identifying the subscriber (such as the subscriber's SIM identifier) and data identifying the search engine 40 are passed by the client application 38 in a request for service message to the search engine 40—step D1.

At this stage in the transaction, the search engine 40 has been provided with certain details of the subscriber. However, this information might be provided by somebody who is not truly the subscriber. To authenticate the search request, the search engine 40 constructs a service context $S_C$ and sends this to the client application 38—step E1. The service context $S_C$ is a data packet that may include the following fields:
  an identifier of the search engine 40,
  an identifier of the subscriber, and/or
  details of the search to be performed
Additional or alternative information may also be provided.

The client application 38 passes the service context $S_C$ to the authenticator module 30 (step F1).

The authenticator module 30 analyses the service context $S_C$ and establishes that a request for authentication of the search request by the network 3 is required. The authenticator module checks that the subscriber's dongle 32 containing their SIM 15 is present (step G1). If the dongle 32 is not present, the user is prompted to make their dongle available. The authenticator module 30 may also display a description of the transaction to be authenticated—and the user is provided with the option to approve or disapprove the transaction. Assuming that the dongle is present and the transaction is approved by the subscriber, the authenticator module 30 then sends a request to the service gateway 44 of the network 3 for a security token $S_X$ (step H1). The request sent to the service gateway 44 includes the service context $S_C$. The communications between the authenticator module 30 and the service gateway 44 of the network 3 may be transmitted over the secure communication channel 21 using a selected key set in the manner described in the previous embodiment. The service gateway 44 then performs the authentication procedure described in relation to the previous embodiment by data exchange with the SIM 15 using the challenge and response procedure described above. The dongle 32 may be programmed to display the name of the application or organisation requesting data from the SIM 15 and may then prompt the user to approve the supply of data for each or selected applications/organisations by entering the user's PIN using the key pad or by providing other identifying data.

When the authentication procedure has been completed (step I1) the service gateway 44 issues a security token $S_X$ to the authenticator module 30 (step J1).

The security token $S_X$ is a data packet which includes the service context $S_C$ and the following fields:
  information identifying the subscriber,
  an indication of the search engine 40 identity, and/or
  details of the search request
Other fields may be provided additionally or alternatively, depending on the circumstances.

The authenticator module 30 passes the security token $S_X$ to the client application 38 (step K1).

The security token $S_X$ includes data specific to a particular subscriber and search request with a particular search engine 40. Numerous transactions can be handled by the network 3, authenticator module 30 and search engine 40 in parallel. These will be distinguishable from one another by virtue of the data specific to a particular transaction with a particular service provider 40 in the security token $S_X$. If the security token $S_X$ is intercepted as it passes between the network 3 and the authenticator module 30, or between the client application 38 and the search engine 40, it will have no value to the interceptor.

The security token $S_X$ then passes from the client application 38 to the search engine 40—step L1.

On receipt of the security token $S_X$ by the search engine 40, its content is analysed and, if it is established that it corresponds to a service context $S_C$ issued by the search engine 40, the search engine 40 may assume that the search request is legitimately made by the subscriber. The security token $S_X$ indicates that the subscriber has been authenticated in respect of this search request.

As in the previous embodiment, the search engine 40 extracts the search criteria (in this embodiment from the security token $S_X$). A search is then performed of the data available to the search engine 40 and the search results are generated. If the search results include any items having tags associated therewith, the search engine 40 analyses the content of the tag. In this embodiment the tag includes, in addition to an indication that the item has restricted access, also data that allows the content of the item to be identified by the search engine 40—for example, in the form of meta tags. This is advantageous, because the content of the item cannot be readily determined by the search engine 40 because it is encrypted. If the search results indicate that any tagged items (for example, photographs of A's children) are relevant to the search criteria, the search engine will determine that the tag will allow any specified individuals to access the data (A's relatives). The search engine knows the identity of the user of the dongle 32 by virtue of the security token $S_X$ and can be satisfied that this is accurate because the SIM 15 within the dongle 32 has been authenticated with the network. The search results can therefore include references to items with tags indicating that the user of the dongle 32 has permission to view the item associated with those tags. Other data sources with tags to which the user of dongle 32 is not entitled access are not included in the search results. The search results are transmitted to the client application 38 via link 42—step M1.

When the user wishes to access a tagged item, the encrypted item is retrieved from the database 41 by clicking the appropriate link in the search results. A mechanism is required to allow the encrypted items returned to be decrypted so that they can be accessed by the subscriber. This may be performed in several ways. As explained above, the keys to decrypt the tagged item are stored in a key store 51 that is accessed by the service gateway 44 of the network 3.

In one arrangement, the search engine 40 generates a request to the service gateway 44 (via the link 48) for the key associated with a relevant tag. This request is transmitted together with the security token $S_X$ to the service gateway 44. The service gateway 44 is able to check the validity of the security token $S_X$ as it was issued under the service gateway's 44 control. The service gateway 44 then retrieves the relevant decryption key from the key store 51 and returns this to the search engine. The search engine 40 may then itself decrypt the relevant encrypted item using the key and transmit this to the client application for use by the subscriber. Alternatively, the encrypted item can be transmitted to the client application together with the decryption key via link 42.

Further alternatively, the encrypted item can be transmitted to the client application via link 42. In this arrangement, rather than the service gateway 44 transmitting the decryption key to the search engine 40 via link 42 in response to a request from the search engine 40, the service gateway 44 transmits the decryption key to the authenticator module 30 via the link 21. The decryption key may be encapsulated in a secure data packet (using the agreed key set and secure communication channel described above), which data packet also includes the security token $S_X$. In this manner, the transmission of the encrypted data 42 and the transmission of the decryption key are performed over separate communication paths (42 and 21), which enhances security.

The header of the data packet within which the security token $S_X$ is encapsulated may include a command interpretable by the authenticator module 30, requiring the dongle 32 to obtain from the subscriber their PIN (or biometric data) using the buttons 56. The command is transmitted to the dongle and the PIN (or other data) is input. This is then returned to the service gateway 44 and compared to pre-stored data provided by the subscriber previously. The data packet including the decryption key and security token $S_X$ is only allowed to be passed to the client application 38 if a message is returned to the dongle 32 by the service gateway 44, indicating that the PIN/biometric data is correct.

On receipt of the data packet, the client application 38 is able to extract the decryption key and decrypt the encrypted item.

In the embodiments described, the search results generated by the search engine 40 have included items that have restricted access. Of course, if the search results do not include any items that have restricted access, authentication of the user is not necessary.

As indicated above, the client application 38 may be the search engine 40 itself, or a module of the search engine 40. The search engine 40 (or the module thereof) present on the PC 23 is able to search data stored locally on the PC—for example on its hard drive and on any storage devices coupled to the PC. The search results generated by the search engine may include items stored locally on the PC. The search rights may also include items stored remotely—for example, by an Internet link if the search engine 40 is implemented only on the PC 23. For example, a user may wish to obtain information concerning a particular purchase he had made using his bank account. The search criteria may cause the search engine 40 to identify relevant items stored locally on the PC 23, such as a letter generated by the subscriber to their bank. The search criteria may also cause the search engine to identify an entry from the subscriber's bank's (remote) website which provides secure details of transactions performed by the subscriber. The details on this website will clearly have restricted access. However, these items will have a tag of the type described above, which allows the relevance of the item to be assessed by the search engine and the search results provided to subscribers authorised to view those tags. In this way, a subscriber can conveniently search locally and remotely stored data, some of which is secured, using a single search engine 40.

The tag associated with an item that has restricted access, rather than including a list of users entitled to access that item, may indicate that certain criteria must be met before the item can be accessed. For example, the content of some websites may be suitable only for those over eighteen years of age. Conveniently, the network 3 may store the age of each of the subscribers thereto, and the authentication process performed with the network may return information indicative of the age of the subscriber. On receipt of this information, the search engine 40 is operable to only generate in the search results details of items that the subscriber has permission to view by virtue of their age with reference to the age criteria in the tags of certain items. It will be appreciated that this contrasts with conventional blocking of websites. With conventional blocking of websites, the details of blocked items are listed in the search results. When a user wishes to access a blocked item by, for example clicking on the search result, information from the relevant website will not be returned. However, the search result relating to that blocked website will be provided to the user. These may themselves be inappropriate. Further, listing search results which are not accessible to the user can lead to a frustrating browsing experience.

In the embodiment described above, the dongle 32 is coupled to a PC 23, and the client application 38 and authenticator module 30 are implemented in the PC 23. It should be understood that the use of a PC 23 is not essential to the invention. For example, other data processing apparatus could be provided instead—for example, a set-top box associated with a television which communicates with the service gateway 44, dongle 32 and search engine 40 via suitable links (such as fixed telephone, cable, satellite or other wireless link).

The methods described herein may be performed by a computer program.

The invention claimed is:

1. A method of searching a plurality of data items which include selected data items with respective access tags defining access criteria for the selected data items, the method comprising:
   receiving by a computer executing a search engine a search request token including search criteria and data identifying a user from an entity associated with the user;
   verifying the user by transmitting a challenge to the entity through an authenticator module, wherein the challenge is encrypted using a selected key set and the challenge includes a command for data to be provided, extracting and executing the command by the entity, generating a corresponding response by encrypting the challenge in dependence upon an authentication algorithm and a unique key stored on the entity, wherein the response is encrypted using the selected key set, and receiving the response from the entity through the authenticator module, to confirm that the user is a subscriber with a communications network;

identifying data items from the plurality of data items which are potentially relevant to the search criteria;

for any identified data items having access tags, determining whether the verified user has permission to access the identified data items with reference to the data of the search request token, wherein the access tags are analyzed by the search engine and the access tags include data that allow contents of the identified data items to be identified by the search engine; and generating search results including an indication of identified data items but excluding any such data items for which it is determined that the verified user does not have permission to access, wherein the entity is provided with authentication storage means for storing authentication information, wherein the authentication storage means comprises a subscriber identity module, wherein the subscriber identity module has data used for authentication to authenticate transactions and the subscriber identity module is used for authentication for telephone communications.

2. The method of claim 1, wherein the subscriber identity module has a first record and a second record, wherein the first record of the subscriber identity module has the data used for the authentication to authenticate transactions and the second record of the subscriber identity module is used for the authentication for telephone communications.

3. The method of claim 2, wherein the authentication storage means comprises data for authenticating the entity with a Group Special Mobile (GSM) or Universal Mobile Telecommunications System (UMTS) mobile telecommunications network.

4. The method of claim 3, wherein the authentication information stored on the authentication storage means is usable to authenticate a mobile telephone handset with the communications network.

5. The method of claim 2, further including coupling the authentication storage means to authenticating means via the communications network.

6. The method of claim 5, wherein the authenticating means is associated with a Group Special Mobile (GSM) or Universal Mobile Telecommunications System (UMTS) mobile telecommunications network.

7. The method of claim 5, wherein the communications network includes a Group Special Mobile (GSM) or Universal Mobile Telecommunications System (UMTS) mobile telecommunications network.

8. The method of claim 5, wherein the communications network includes the Internet.

9. The method of claim 5, further including establishing a secure communication channel between the communications network and the authentication storage means.

10. The method of claim 9, wherein said authentication storage means and said authenticating means are provided with corresponding encryption and decryption schemes.

11. The method of claim 10, including establishing the secure communication channel between the authentication storage means and the authenticating means using one of said schemes and encrypting data in at least one message in accordance with that scheme.

12. The method of claim 5, wherein a step of authenticating the entity includes authenticating the entity with the authenticating means using the authentication information stored on the authentication storage means.

13. The method of claim 5, wherein the authentication storage means is coupled to the authenticating means by a data processing apparatus.

14. The method of claim 13, wherein a secure channel extends through the data processing apparatus.

15. The method of claim 13, wherein the identifying step is performed by the search engine and wherein the search engine is located remotely from the data processing apparatus.

16. The method of claim 5, wherein the transmitting of the challenge includes transmitting the challenge from the authenticating means to the authentication storage means, and receiving the response from the authentication storage means.

17. The method of claim 1, further including providing the entity with a list of identified data items, including any data items having access tags for which it is determined that the entity has permission to access.

18. The method of claim 17, including enabling the entity to access the identified data items from the list.

19. The method of claim 1, wherein at least some of the data items having access tags include encrypted content, the method further including obtaining decryption key means for decrypting the encrypted content for data items that the entity has permission to access.

20. The method of claim 19, wherein the decryption key means is provided by the communications network.

21. The method of claim 1, wherein the identifying step is performed by a search engine.

22. The method of claim 1, further including prompting the entity to provide identity data.

23. The method of claim 22, wherein the identity data includes a personal identification number (PIN) or biometric data.

24. The method of claim 22, wherein the identity data is transmitted to authenticating means.

25. An apparatus comprising one or more processors and one or more memories, the one or more processors executing instructions stored on the one or more memories, for performing the method of claim 1.

26. One or more non-transitory computer-readable media having computer-readable instructions thereon, which, when executed, implement a method for searching a plurality of data items which include selected data items having respective access tags defining access criteria for the selected data items, the method comprising:

receiving a search request token including search criteria and data identifying a user from an entity associated with the user;

verifying the user by transmitting a challenge to the entity through an authenticator module, wherein the challenge is encrypted using a selected key set and the challenge includes a command for data to be provided, extracting and executing the command by the entity, generating a corresponding response by encrypting the challenge in dependence upon an authentication algorithm and a unique key stored on the entity, wherein the response is encrypted using the selected key set, and receiving the response from the entity through the authenticator module, to confirm that the user is a subscriber with a communications network;

identifying data items from the plurality of data items which are potentially relevant to the search criteria;

for any identified data items having access tags, determining whether the verified user has permission to access the identified data items with reference to the data of the search request token, wherein the access tags are analyzed by a search engine and the access tags include data that allow contents of the identified data items to be identified by the search engine; and generating search results including an indication of identified data items but excluding any such data items for which it is determined that the verified user does not have permission to access, wherein the entity is provided with authentication storage means for storing authentication information, wherein the authentication storage means comprises a subscriber identity module, wherein the subscriber identity module has data used for authentication to authenticate transactions and the subscriber identity module is used for authentication for telephone communications.

27. The one or more non-transitory computer-readable media of claim 26, wherein the subscriber identity module has a first record and a second record, wherein the first record of the subscriber identity module has the data used for the authentication to authenticate transactions and the second record of the subscriber identity module is used for the authentication for telephone communications.

28. The one or more non-transitory computer-readable media of claim 27, wherein at least some of the data items having access tags include encrypted content, the one or more computer-readable media further including instructions for obtaining decryption key means for decrypting the encrypted content for data items that the entity has permission to access.

29. The one or more non-transitory computer-readable media of claim 27 or 28, wherein the identifying step is performed by a search engine.

30. Apparatus for searching a plurality of data items, the apparatus comprising:

means for providing selected data items with respective access tags defining access criteria for the selected data items;

means for authenticating a user that wishes to perform a search by transmitting, through an authenticator module, a challenge to an entity associated with the user, wherein the challenge is encrypted using a selected key set and the challenge includes a command for data to be provided, extracting and executing the command by the entity, generating a corresponding response by encrypting the challenge in dependence upon an authentication algorithm and a unique key stored on the entity, wherein the response is encrypted using the selected key set, and receiving the response from the entity through the authenticator module, to confirm that the user is a subscriber with a communications network;

means for receiving a search request token including search criteria and data identifying a user from the entity associated with the user;

means for identifying data items potentially relevant to the search criteria;

means for determining, for any identified data items having access tags, whether an authenticated entity has permission to access the identified data items with reference to the data of the search request token, wherein the access tags are analyzed by a search engine and the access tags include data that allow contents of the identified data items to be identified by the search engine; and means for generating search results including an indication of identified data items but excluding any such data items for which it is determined that the user does not have permission to access, wherein the entity is provided with authentication storage means for storing authentication information, wherein the authentication storage means comprises a subscriber identity module, wherein the subscriber identity module has data used for authentication to authenticate transactions and the subscriber identity module is used for authentication for telephone communications.

31. The apparatus of claim 30, wherein the subscriber identity module has a first record and a second record, wherein the first record of the subscriber identity module has the data used for the authentication to authenticate transactions and the second record of the subscriber identity module is used for the authentication for telephone communications.

* * * * *